(12) United States Patent
Griffin et al.

(10) Patent No.: US 11,743,438 B1
(45) Date of Patent: Aug. 29, 2023

(54) METHOD FOR REDUCING A COLOR SHIFT OF IMAGE PIXELS OF AN IMAGE FOR A MOTOR VEHICLE CAPTURED BY A CAMERA

(71) Applicant: Connaught Electronics Ltd., Tuam (IE)

(72) Inventors: Mark Patrick Griffin, Troy, MI (US); Brian Michael Thomas Deegan, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 17/656,359

(22) Filed: Mar. 24, 2022

(51) Int. Cl.
| | |
|---|---|
| *H04N 9/64* | (2023.01) |
| *G06T 7/90* | (2017.01) |
| *H04N 5/265* | (2006.01) |
| *H04N 5/262* | (2006.01) |
| *G06T 5/50* | (2006.01) |
| *G06V 20/56* | (2022.01) |

(52) U.S. Cl.
CPC .............. *H04N 9/646* (2013.01); *G06T 5/50* (2013.01); *G06T 7/90* (2017.01); *G06V 20/588* (2022.01); *H04N 5/265* (2013.01); *H04N 5/2624* (2013.01); *G06T 2207/10024* (2013.01); *G06T 2207/20212* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2016/0005381 A1* | 1/2016 | Yata ..................... | G09G 3/2074 345/82 |
| 2018/0204310 A1 | 7/2018 | Junglas et al. | |
| 2019/0149780 A1* | 5/2019 | Hikosaka ............. | H04N 25/133 348/234 |

* cited by examiner

*Primary Examiner* — James M Hannett
(74) *Attorney, Agent, or Firm* — Osha Bergman Watanabe & Burton LLP

(57) ABSTRACT

A method for reducing a color shift of image pixels of an image for a motor vehicle captured by a camera, a computer program product and a control device for the vehicle are disclosed. For the respective image pixel of the image, the method involves determining a color information, which describes a color of the image pixel, checking whether the determined color information is larger than a minimum color information and smaller than a maximum color information, wherein the minimum and maximum color information delimit a color information range, in which reference image pixels describing a reference object sway. When the checking is successful, calculating a corrected color information in consideration of the determined color information and a correction factor and providing the calculated corrected color information instead of the determined color information, wherein the corrected color information in comparison to the determined color information has a reduced color shift.

15 Claims, 5 Drawing Sheets

US 11,743,438 B1

METHOD FOR REDUCING A COLOR SHIFT OF IMAGE PIXELS OF AN IMAGE FOR A MOTOR VEHICLE CAPTURED BY A CAMERA

FIELD OF THE INVENTION

The invention relates to a method for reducing a color shift of image pixels of an image for a motor vehicle captured by a camera. The invention moreover relates to a computer program product and a control device for a motor vehicle.

BACKGROUND

By an optical capturing system for a motor vehicle, which often comprises several cameras, various kinds of representations of an environment of the motor vehicle can be realized, each of which can be composed of several camera images, which are captured by the capturing system. To start with, individual camera images, each of which for example describe a predetermined subarea of the environment of the motor vehicle, may be newly mapped in an overall representation for this purpose, for example by selecting and combining the individual camera images with each other. Thus, a mosaic image may be created as a new overall image, which for example represents a top view of the environment of the motor vehicle from a bird's eye view perspective, in the center of which the motor vehicle is arranged. Such a top view representation may alternatively be referred to as top view representation.

The camera image taken by a camera of the motor vehicle and/or the overall representation is often modified by at least one algorithm of the image processing prior to being displayed for example by a display device in the interior of the motor vehicle to a user of the motor vehicle.

US 2018/0204310 A1 for example shows a visualization system for a motor vehicle. A noise level in image data of the visualization system is improved by applying a lens shading algorithm to the image data.

Reasons for the processing of the camera image and/or the overall representation are for example changing or different lighting conditions and/or a behavior of the camera lens of the employed camera so that for example a color shift of individual or several image pixels of the camera image or of the overall representation, respectively, may occur that should be corrected.

SUMMARY

It is the task of the invention to provide a solution by which a color shift of image pixels can be reduced.

A first aspect of the invention relates to a method for reducing a color shift of image pixels of an image for a motor vehicle captured by a camera. It is assumed that, for example by a camera of the motor vehicle at least one image is captured. The image describes for example a subarea of an environment of the motor vehicle. This means that the image describes for example at least partially at least a part of a road surface of a road, on which the motor vehicle is arranged, of an infrastructure adjoining the road surface, for example a building, a plant, and/or of another road user, such as another motor vehicle and/or a person. The image may alternatively be referred to as camera image. The image may further be an overall image composed of several camera images. The image comprises numerous image pixels, which together result in the image. The camera, which captures the image at least partially, is for example a front camera, a rear camera, and/or a side camera of the motor vehicle. Further, the captured image may not be captured by the motor vehicle itself, but rather be provided to the vehicle for example via a communication link by an external device, such as for example another motor vehicle, a computing device, and/or an infrastructure device, for example a traffic observation camera.

The invention is based on the insight that the image often comprises in at least one subarea of the image a color shift of a hue of the image pixels there. The color shift may alternatively be referred to as hue shift. The color shift may be due to camera lens related non-uniformities in a color representation of a camera lens of the respective camera. Depending on the condition of the camera lens, a hue in the image for example in a subarea of the image may have a color cast towards cyan or blue and in another subarea towards magenta or red so that the hue of a for example monochromatic area in the image may sway locally. This for example leads to individual subareas of the image having a blue cast visible to a viewer of the image, whilst other subareas of the image have a red cast. Often this non-uniformity with regard to the hue occurs in edge regions of the image, which are arranged far away from an image center. Particularly conspicuous is the described color shift in large-scale, monochromatic objects in the image, such as for example the gray surface of the road. Therefore, a correction of color values of individual image pixels of the image should occur, in order to be able to achieve an overall representation of the image harmonized in terms of the color representation.

It may be envisaged that by an image signal processor of the camera non-uniformities in the color representation are already counteracted, for example by applying a lens shading algorithm of the image signal processor to the image. However, it may be the case that this does not suffice and further measures for reducing the color shift of individual image pixels of the image are required. This may for example be the case for heavy color fall-offs between individual camera lenses, if the color fall-off has a profile that cannot be modelled by simple methods, for example because it cannot be modelled using a polynomial curve fit. Then an additional correction of the color values of at least individual image pixels may be useful.

This means that an additional processing step for the image should be provided which is suitable for reducing the color shift of the image pixels. Since the observed color shift may depend on incident light so that for example depending on the position of the sun the color-shifted image pixels vary, this processing step should provide a correction for each image pixel individually that invariably considers the current color shift by which the respective image pixel is affected.

The method according to the invention comprises several method steps, which are performed for the respective image pixel of the image captured by the camera. Preferably, each individual image pixel of the captured image or at least one subarea of the captured image is taken into consideration as part of the method. A method step envisages a determining of a color information describing a color of the image pixel. The image information for example indicates whether the image pixel is hued red, orange, yellow, green, blue, purple or magenta. Alternatively, the color information may be referred to as color data, wherein the color data then describe the color of the image pixel, for example by a color value. The color value can for example take a numeric value or be a coordinate in a color space of a color model.

In a further method step a checking is effected as to whether the determined color information is larger than a minimum color information and smaller than a maximum color information. The minimum and maximum color information delimit a color information range, in which reference image pixels describing a reference object sway, in particular typically sway. The reference object may for example be the road surface, namely a light gray, dark gray, or black object. The minimum and maximum color information delimit for example a color space region of the color space of the color model, according to which the determined color information is described. In the color information range lies the color information of numerous and in particular all image pixels of the image, which describe the reference object or an object that is at least similar to the reference object in terms of color. The minimum and maximum color information may for example be determined by a calibration method, which for example is performed prior to applying the hitherto described method or at its beginning. This means, in other words, it is checked whether the color information of the image pixel lies within the color information range delimited by the minimum and maximum color information or not. Preferably the minimum and maximum color information delimit a predetermined subarea of the overall color space, which for example lies merely in a typical color information range of the reference object, for example the gray road surface. The delimited color information range comprises color information with a color cast or a hue shift, for example towards cyan or magenta. This means that, when checking, for example each image pixel is checked as to whether its color information suggests that it describes the reference object that is for example the gray road surface since the determined color information is larger than the minimum color information and smaller than the maximum color information. An image pixel describing for example a blue sky or a green lawn in the environment of the motor vehicle in this example would not be recognized as color information of an image pixel which lies within the color information range delimited by the minimum and the maximum color information, in case the reference object is the gray road surface.

Only in case the determined color information is larger than the minimum color information and smaller than the maximum color information, the calculating of a corrected color information for the image pixel is effected. The calculation is effected in consideration of the determined color information and a correction factor. The correction factor is predetermined and for example depending on a camera lens of the camera by which the image was captured. Subsequently providing of the calculated corrected color information instead of the determined color information is effected. The corrected color information in comparison to the determined color information has a reduced color shift. This is achieved by recalculating the color information of the image pixels affected and thus shifting it according to the correction factor to the corrected color information. The corrected color information differs from the calculated color information. In other words, for all the image pixels for which the checking was successful the determined color information is replaced by the corrected color information. In case the determined color information is not both larger than the minimum color information and smaller than the maximum color information, it is envisaged that no corrected color information is calculated. For these image pixels thus the determined image information is provided. This means that only the color information is modified that is assigned to an image pixel for which the checking was successful.

The method may end with providing the image with all its image pixels, wherein for all the image pixels for which the checking was successful instead of the determined color information the corrected color information is provided. This means that exactly those image pixels are corrected whose color information lies outside the color information range delimited by the minimum and maximum color information. All other image pixels are maintained unchanged in terms of their color information. Hereby a reduction of color shift in selected image pixels is ultimately achieved since instead of the determined color information, if required, the corrected color information with the reduced color shift in comparison to the determined color information is provided.

An advantageous embodiment envisages that the reference object is a road surface or a light box. The road surface is in particular a gray road surface, for example a bright gray or dark gray road surface. The road surface is for example a surface of a tarred road. The light box is for example an object which emits light of a predetermined wavelength, typically in the range of white light. A color information and/or a brightness information of the light emitted by the light box is preferably predetermined and thus known. Preferably a color of the reference object consequently is in a color information range of black/dark gray to bright gray/white. Often an object with a color information in this color information range is encountered in the environment of the motor vehicle since the motor vehicle often is located on a gray road surface. A top view of the environment directly adjoining the motor vehicle therefore as a rule comprises at least one gray subarea, which often comprises a large subarea of the top view in comparison to the remaining top view. Depending on the selected brightness the gray region in the color space of the color model may correspond to a white region in the color space so that by reference to the light box as reference object color shifts can be recognized, which can be transferred to a gray object, such as the road surface. By the selection of the reference object thus the method is specialized in recognizing and correcting color shifts in a color space that is typical of the environment of the motor vehicle resulting in a wide application range for the method in motor vehicles.

An additional embodiment envisages that the respective determined color information is described by a U color value and/or a V color value of a YUV color model. This means that a common color model suitable for describing the color information of an image pixel may be resorted to. The YUV color model can describe for an image pixel the brightness by a Y value and the color by a U and a V value, that is by the U and the V color value. The U and V values span a color space, which can be referred to as UV color space, in which all colors for a respective Y value can be represented. In case only the U and the V color values are considered, consequently a two-dimensional color space is mapped, which for example reaches from a U to a V axis, each from a value 0 to a value 255. The color information thus comprises two individual color values, namely the U and the V color value. By indicating the two color values together the color information can be precisely indicated, that is eventually the color of the image pixel can be described.

It is in particular envisaged that the minimum color information is described by a minimum U color value and/or a minimum V color value and the maximum color information by a maximum U color value and/or a maximum V color value. Thus a total of four color extreme values are known by which eventually a subarea of the UV color space of the YUV color model is delimited.

In a further embodiment it is envisaged that the minimum and maximum U color value and the minimum and maximum V color value delimit a color space region which is arranged around the center of the UV color space of the YUV color model. The UV color space at the U color value 128 and the V color value 128 comprises a center, wherein around the center, depending on the Y value, the colors black/dark gray to bright gray/white are arranged. By placing the delimited color information range in terms of color in this location it is achieved that only the object in the image can be corrected in terms of its color information whose color lies between black/dark gray and bright gray/white, whereas for example an object in the image which has a different color, that is for example colored blue, green, red, or yellow, remains unaffected in terms of its color information. Hereby it is ensured that the reducing of the color shift is effected only in the subarea of the image, in which it makes sense for example due to a large surface representation of the gray road surface, in which the color shifts are particularly conspicuous.

An additional embodiment envisages that a distance between the determined color information and the corrected color information in the UV color space is the larger the further the determined color information is away from the center of the UV color space. This means that a degree of correction of the color information depending on the individual pixel is envisaged. This leads to the fact that for example an image pixel with a large color cast, whose color information is thus far away from the center of the UV color space, is modified more strongly than an image pixel having a small color cast in comparison thereto since it is arranged more closely to the center of the UV color space. This causes a difference between the determined and the corrected U and V color values of the color information for the image pixel with the large color cast to be larger than for the image pixel with the small color cast. This means that not every image pixel which in the checking is found to require correction is corrected to the same degree.

The calculation of the corrected U color value from the determined U color value can for example be effected, to start with, by determining a difference value from the center of the UV color space by subtracting the number 128 from the determined U color value of the image pixel. The corrected U color value then is calculated as difference, wherein the determined U color value is the minuend and the product of the difference value with the correction factor is the subtrahend. The calculation for the corrected V color value is effected in analogy thereto. The correction factor is for example 0.75. Alternatively, the correction factor can lie between 0.5 and 1, between 0.6 and 0.9, in particular between 0.7 and 0.8. Hereby it is realized that the degree of the applied correction depends on the distance of the determined U or V color value, respectively, from the center of the UV color space and thus on the individual image pixel. Eventually hereby it is achieved that color information lying closer to the edge region of the delimited color information range are corrected more strongly towards the center so that on the whole an as homogenous as possible color representation, for example of the gray road surface, in the provided image is given. By the described considering of the determined color information and the correction factor it can be achieved that not every image pixel is corrected to the same degree but a gradual correction is possible or a gradient is taken into consideration during the correction.

In an embodiment it may be envisaged that a number of image pixels is determined for which the determined color information is larger than the minimum color information and smaller than the maximum color information. Then it is checked whether the determined number is larger than a minimum number. In case the determined number is smaller than or equal to the minimum number, an alternative minimum color information and an alternative maximum color information is determined by evaluating the image pixels. The color information range delimited by the alternative minimum and maximum color information is arranged in particular spaced from the center of the UV color space of the YUV color model. Subsequently for example the aforementioned method can be performed in consideration of the alternative minimum and the alternative maximum color information. Hereby it is for example achieved that, in case the motor vehicle is not arranged on a gray road surface, but for example on a grass surface, to begin with, an adjustment of the minimum and maximum color information to this environment of the motor vehicle is performed. This is because all or at least numerous image pixels of the captured image of the grass surface do not describe a gray or white object, for which, however, for example the hitherto method is configured. It may hereupon be envisaged that the reducing of the color shift of the image pixels is nevertheless possible since possible deviations in the green color range can be reduced by calculating the alternative minimum and maximum color information and taking it into consideration in the following. It may be envisaged that, for a start, a new calibration is to be performed in order to be in a position to calculate the alternative minimum and maximum color information, for example using a reference object having a different color, in particular green.

Alternatively or additionally it may be envisaged that only in case the determined number is larger than the minimum number, the corrected color information for the corresponding image pixels is calculated. This means that for example a control step may be provided, in which, whenever for example only few enough gray image pixels in the image are found for their number to be smaller than or equal to the minimum number, the further method steps are not carried out in the first place, but rather it is merely determined that the captured image is not suitable for the method since there are not sufficient image pixels given in the relevant color space region. This means that, first of all, it is checked whether the captured image is suited at all to be processed by the method as it for example comprises a gray and/or white region, in which the correction can be performed. Hereby unnecessary calculation effort is avoided, which otherwise might occur, if the method were continued to be performed without considering the number of image pixels affected.

The minimum number may be indicated in percentage and for example lie at 5 percent, 10 percent, 20 percent, 30 percent, 40 percent, 50 percent, 60 percent, 70 percent, 80 percent, 90 percent or in particular between larger than 90 percent and smaller than 100 percent of a total number of image pixels of the image.

Moreover, an embodiment envisages that prior to checking the determined color information of the respective image pixel a harmonizing function is applied to the image. The harmonizing function performs a brightness and/or color harmonization for the image. Accordingly, it may be envisaged that already prior to checking whether the determined color information is larger than the minimum color information and smaller than the maximum color information already a harmonization with regard to the brightness and the color of the image can be performed. The harmonization in particular makes sense if the image is an overall representation composed of individual camera images, which for example were captured in different light conditions, since they for example show different regions of the environment of the motor vehicle. Then by applying the harmonizing function a brightness and color correction can be performed, in which in particular in the transition regions between two camera images a brightness and color adjustment between the two camera images is effected. However, it further is possible that color shifts of individual image pixels in the harmonized image can be observed, for example due to a condition and quality of the camera lens varying from camera lens to camera lens of a certain camera type. Such slight color shifts, however, typically are not corrected by applying the harmonizing function but rather require the inventive method for calculating the corrected color information. Accordingly, it is achieved that by applying the harmonizing function earlier a pre-correction of the colors in the image has been effected already and thus the starting image represents a reasonable basis for a fine tuning correction, which can be achieved by the calculation of the corrected color information. Hereby it can be achieved that in the end an optimum reduction of the color shift can be accomplished eventually.

Moreover, it may be envisaged in an embodiment that the image is a partial image of an overall image, which is composed of at least two partial images. The overall image may for example be composed of four partial images, one of which was captured by a front camera, one by a rear camera, and two by respective side cameras, which are arranged in side mirrors of the motor vehicle. The composed image can be achieved by combining or merging the individual partial images. Each partial image thus describes a subarea of the environment of the motor vehicle. This means a partial image describing the environment of the motor vehicle in the front region, a partial image describing the environment of the motor vehicle in the rear region, a partial image describing the environment of the motor vehicle on a left side in the longitudinal direction of the motor vehicle, and a partial image describing the environment of the motor vehicle on the right side in the longitudinal direction of the motor vehicle is given. These four partial images can for example be combined with each other into a 360 degree image of the environment or a top view of the motor vehicle. It may be envisaged that for example prior to applying the harmonizing function composing of the individual partial images into the overall image is performed. By means of the harmonizing function in particular boundary regions between the individual partial images can then be harmonized, that is can be adjusted to each other in terms of their brightness and/or color values. This means an optimum employment of the images captured by the various cameras of the motor vehicle can be provided.

Another embodiment envisages that after checking the determined color information for each image pixel of at least two images an overall image is composed. Accordingly, first of all, the determined color information for each image pixel of at least two different images is checked and possibly corrected and only thereafter the overall image is composed of the at least two images. The overall image consequently comprises at least two partial images. The individual images of the overall image thus were already checked according to the above-described method in terms of the color information of their image pixels and the corresponding image pixels corrected by providing the corrected color information, or not by maintaining the determined color information. Hereupon, the harmonizing function is applied to the overall image, wherein at least two images describe different subareas of the environment of the motor vehicle, in particular in the front region, rear region, and/or side region of the motor vehicle. The harmonizing function performs a brightness and/or color harmonization for the overall image, as it has already been described above. This means that it may be the case that the afore-described method, which envisages the checking of the determined color information as well as, if applicable, the calculating of the corrected color information and providing it for the corresponding image pixels, is applied to the partial images and these are only hereupon composed and adjusted to each other by the harmonizing function.

An embodiment envisages that each partial image is a viewport of a camera image captured by the camera, wherein the overall image shows a top view of the environment of the motor vehicle. It may consequently be envisaged that not the complete image captured by a camera is viewed and further taken into consideration but rather that the viewport is selected from the complete image. Viewport is the designation for a viewing window. To display the top view of the environment of the motor vehicle for example the regions of the environment lying at the top in a height direction of the motor vehicle and included in the camera image are not required, such as for example a section of a sky. For this reason only the viewport is taken into consideration as partial image from which the overall image is composed. This is a representation that is particularly preferred for a motor vehicle, which for example can be useful for a driver of the motor vehicle in assisting a parking operation.

An additional embodiment envisages that by applying an object recognition algorithm to the image at least one object in the image is recognized. Only in case the recognized object is a road surface, the respective corrected color information for the respective image pixel of the image is calculated. Accordingly, it is checked whether the captured image, the partial image, or the overall image are suited for the described method, in the first place, by performing the object checking based on the object recognition algorithm and the checking as to whether the recognized object is a road surface or not. The object recognition algorithm is for example a computer program, which contains at least one rule or instruction according to which at least one predetermined object in the image can be recognized. The predetermined object may be the road surface. Further, the object recognition algorithm can differentiate between various kinds of objects, namely recognize for example various classes of objects. Hereby it is avoided that the corrected color information is calculated for image pixels of an image that is not suited at all for applying the described method as it for example does not show a road surface.

In a further embodiment it may be envisaged that the correction factor is predetermined depending on the minimum and the maximum color information. For example a large correction factor may be envisaged if a distance between the minimum and the maximum color information is large in comparison with the case that the distance between the minimum and the maximum color information is small so that in this case a by comparison smaller correction factor may be chosen. This means the smaller the color information space which is delimited by the minimum and the maximum color information, the smaller the correction factor may be chosen, and vice versa. Hereby the correction factor can be adjusted to the behavior of the camera lens in order to be in a position to invariably achieve a reasonable reducing of the color shift.

Moreover, an embodiment is envisaged, according to which the reference pixels were captured by several cameras when performing a calibration method. The several cameras may be assigned to a common camera type. The common camera type may relate to a common camera lens. This means that the several cameras each have a substantially same camera lens. The several cameras consequently for example have a common kind of camera lens and thus the same camera lens. Substantially same means that maximally differences between the individual camera lenses exist, which are irrelevant for the color information range in which the color information of the image pixels may vary. Preferably the camera used when capturing the image equally has the camera lens used when performing the calibration method. The camera used when capturing the image consequently is also assigned to the common camera type. In other words, the calibration method is performed for a specific camera lens.

Preferably at least ten reference images with the reference pixels are taken of the reference object in order to calculate the minimum and maximum color information therefrom. In the reference images for example a region of the road surface and/or the light box is shown and selected from them. Subsequently it is calculated or determined in which color information range, that is in which color space region, the image pixels describing the road surface or the light box sway, even though they actually should all represent the same color information. This means that it is determined whether the reference object in the reference images is described by at least one reference pixel having a color shift, for example a red or blue shift. The color information shifted maximally or minimally in relation to the center of the color space is hereupon taken as the maximum or minimum color information, respectively. In this connection it is relevant that, to start with, for the common camera lens several calibration measurements are performed before the minimum and maximum color information can be provided as predetermined values.

A further aspect of the invention relates to a computer program product. The computer program product may for example be a computer program. The computer program product may be stored on a computer, for example a control device in a motor vehicle. The computer program product comprises at least one instruction, preferably several instructions, which, when the program is executed by a computer, that is for example the control device of the motor vehicle, will perform the above-described method. The computer is for example a computing device. Further, a second computer program product may be provided, according to which the camera captures the image of the environment of the motor vehicle and/or the reference image. Further, a third computer program product may be provided, according to which the described calibration method can be performed.

A further aspect of the invention relates to a control device for a motor vehicle, which is configured for performing the above-described method. The control device comprises a processor device, which can perform the described method. The processor device for this purpose may comprise at least one microprocessor and/or at least one microcontroller and/or at least one FPGA (Field Programmable Gate Array) and/or at least one DSP (Digital Signal Processor). Moreover, the processor device may comprise the computer program product. The control device preferably performs the described method.

The embodiments described in connection with the method according to the invention, individually as well as in combination with each other, as far as applicable and as far as they do not mutually exclude each other, apply in analogy to the computer program product according to the invention as well as to the control device according to the invention.

A further aspect of the invention may be a motor vehicle which comprises the control device according to the invention. The motor vehicle may for example be a passenger car, a truck, a bus, and/or a motorcycle.

BRIEF DESCRIPTION OF THE DRAWINGS

It is shown in.

DETAILED DESCRIPTION

Figure 1:
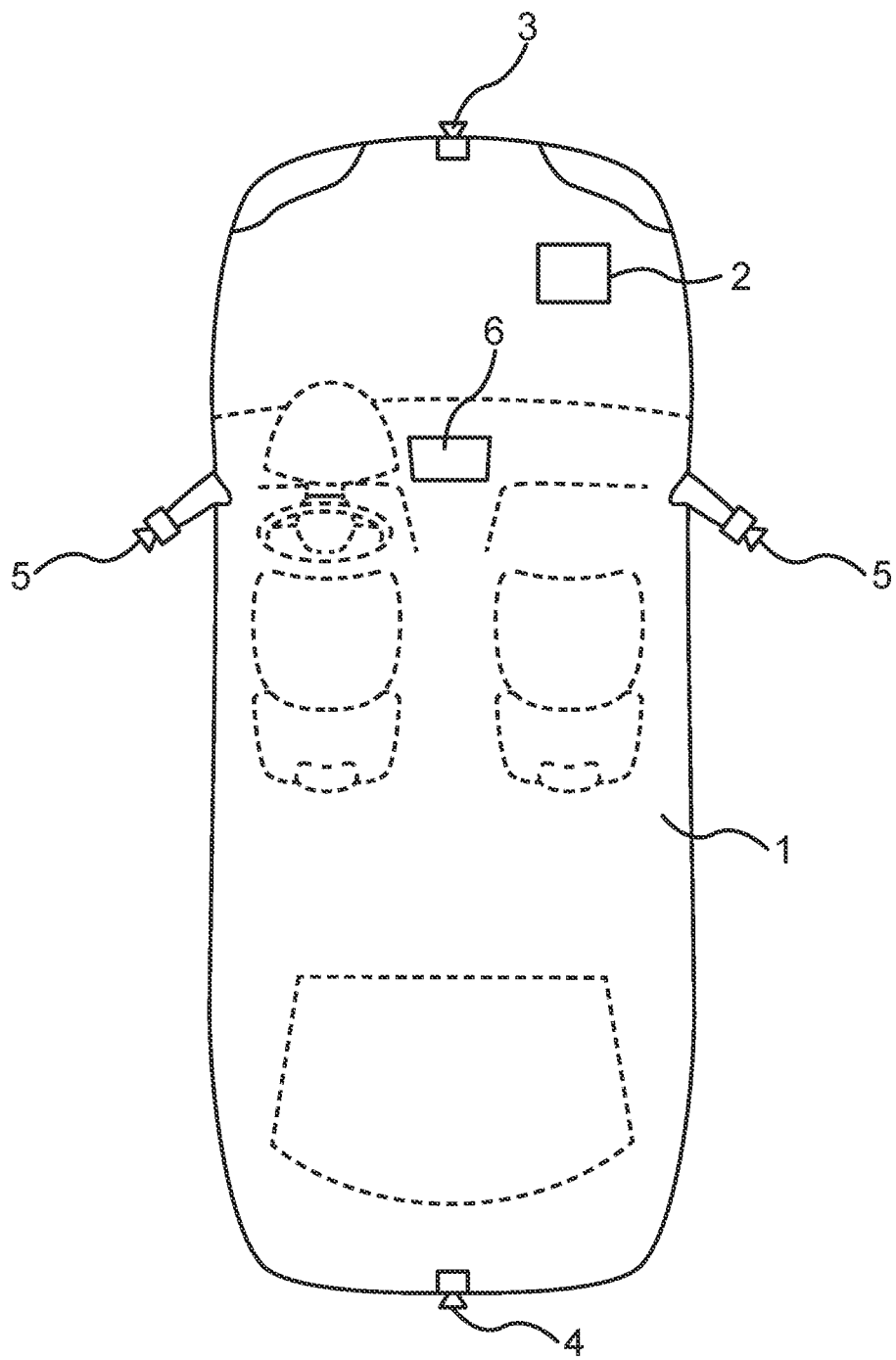
FIG. 1 a schematic view of a motor vehicle comprising a control device and several cameras.

In FIG. 1 a motor vehicle 1 is drafted, which comprises a control device 2. The control device 2 is a computing device that may for example comprise at least one microprocessor and/or one microcontroller. In other words, the control device 2 of the motor vehicle 1 is a computer, which for example can carry out a computer program product that is a computer program.

The motor vehicle 1 comprises several cameras, namely a front camera 3, a rear camera 4, as well as two side cameras 5, each of which is arranged in a side mirror of the motor vehicle 1. In a composition of camera images, which are captured by these four cameras of the motor vehicle 1, for example a 360° environment of the motor vehicle 1 and/or a top view of the motor vehicle 1 may be represented. The representable environment is delimited at least by a capturing range of the respective camera, that is the front camera 3, the rear camera 4, or the side camera 5, respectively.

In the motor vehicle 1 a display device 6 is arranged, which for example is a display, in particular a touch-sensitive display. On the display device 6 for example the camera images captured by the front camera 3, the rear camera 4, and/or the respective side camera 5 can be represented. To this end, the camera images can be manipulated or processed by the control device 2 at first. The individual cameras, namely the front camera 3, the rear camera 4, and/or the side camera 5, may for example each comprise a fish-eye lens, which allows for a 180° capture of the environment. The top view of the environment of the motor vehicle 1 can be provided by selecting for example corresponding sections from each camera image so that for example the current environment of the motor vehicle 1 can be displayed to a user of the motor vehicle 1 at least in part or preferably completely, namely for example by the display device 6, for assisting a parking operation.

Figure 2:
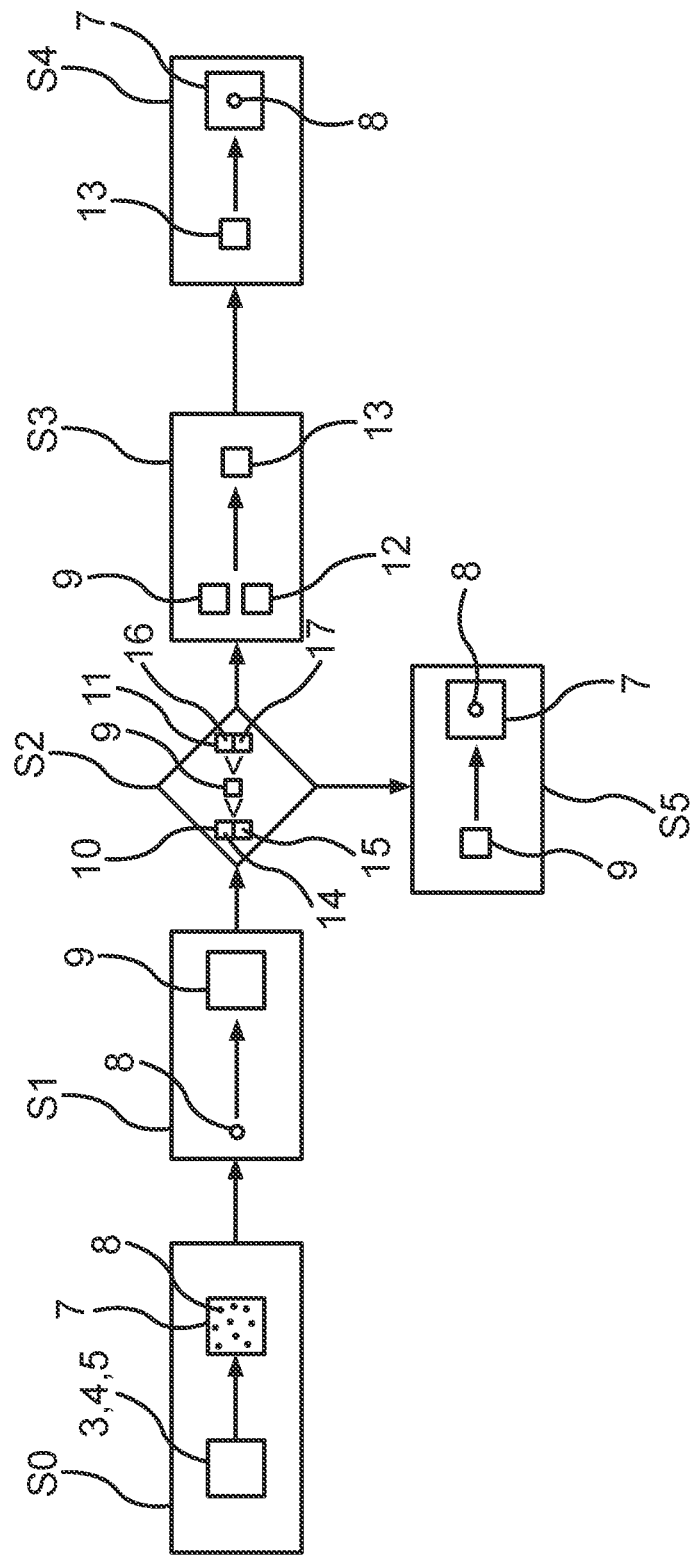
FIG. 2 in a schematic representation a signal flow graph of a method for reducing a color shift of image pixels of an image for a motor vehicle captured by a camera.

In FIG. 2 a method for reducing a color shift of image pixels 8 of an image 7 for a motor vehicle captured by a camera, in particular the front camera 3, the rear camera 4, and/or the side camera 5, is shown. The image 7 may for example be the camera image that was captured by the respective camera.

In a first method step S0 by the front camera 3, the rear camera 4, and/or the side camera 5, the image 7 of the environment of the motor vehicle 1 can be captured, which is composed of individual image pixels 8. A number of image pixels 8 depends on the respective camera. The further method steps S1 to S5 described in the following are preferably performed for each image pixel 8 of the image 7 captured by the respective camera, that is the front camera 3, the rear camera 4, and/or the side camera 5.

In a method step S1, a determining of a color information 9 describing a color of the image pixel 8 is effected. The color information 9 preferably describes a U color value and/or a V color value of a YUV color model. The color information 9 thus preferably comprises for each image pixel 8 two values, namely the U color value and the V color value.

In a method step S2 a checking whether the determined color information 9 is larger than a minimum color information 10 and smaller than a maximum color information 11 is effected. The minimum color information 10 may alternatively be referred to as minimum color information and the maximum color information 11 may alternatively be referred to as maximum color information. The minimum color information 10 and the maximum color information 11 delimit a color information range, in which reference image pixels describing a reference object sway. To this end, the minimum color information 10 may comprise a minimum U color value 14 and/or a minimum V color value 15 and the maximum color information 11 a maximum U color value 16 and/or a maximum V color value 17.

Only in case the determined color information 9 is larger than the minimum color information 10 and smaller than the maximum color information 11, in a method step S3 a calculating of a corrected color information 13 for the image pixel 8 is effected. The calculating is effected in consideration of the determined color information 9 and a correction factor 12. The correction factor 12 may for example amount to 0.75. Hereupon in a method step S4 instead of the determined color information 9 the calculated corrected color information 13 is provided. The corrected color information 13 in comparison to the determined color information 9 comprises a reduced color shift. This means it has been achieved that individual color information 9 of image pixels 8 for which the checking step S2 was successful are modified in such a way that a homogenous color distribution in the image 7 is accomplished. The consequence hereof is moreover that, in case the checking step S2 is not successful, that is in case the determined color information 9 is not both larger than the minimum color information 10 and smaller than the maximum color information 11, in a method step S5 the already determined color information 9 is provided for the respective image pixel 8 since no corrected color information 13 is calculated. On the whole, the image 7 will consequently comprise image pixels 8 which either comprise the determined color information 9 or the corrected color information 13, depending on which result the checking step S2 has produced.

Figure 3:
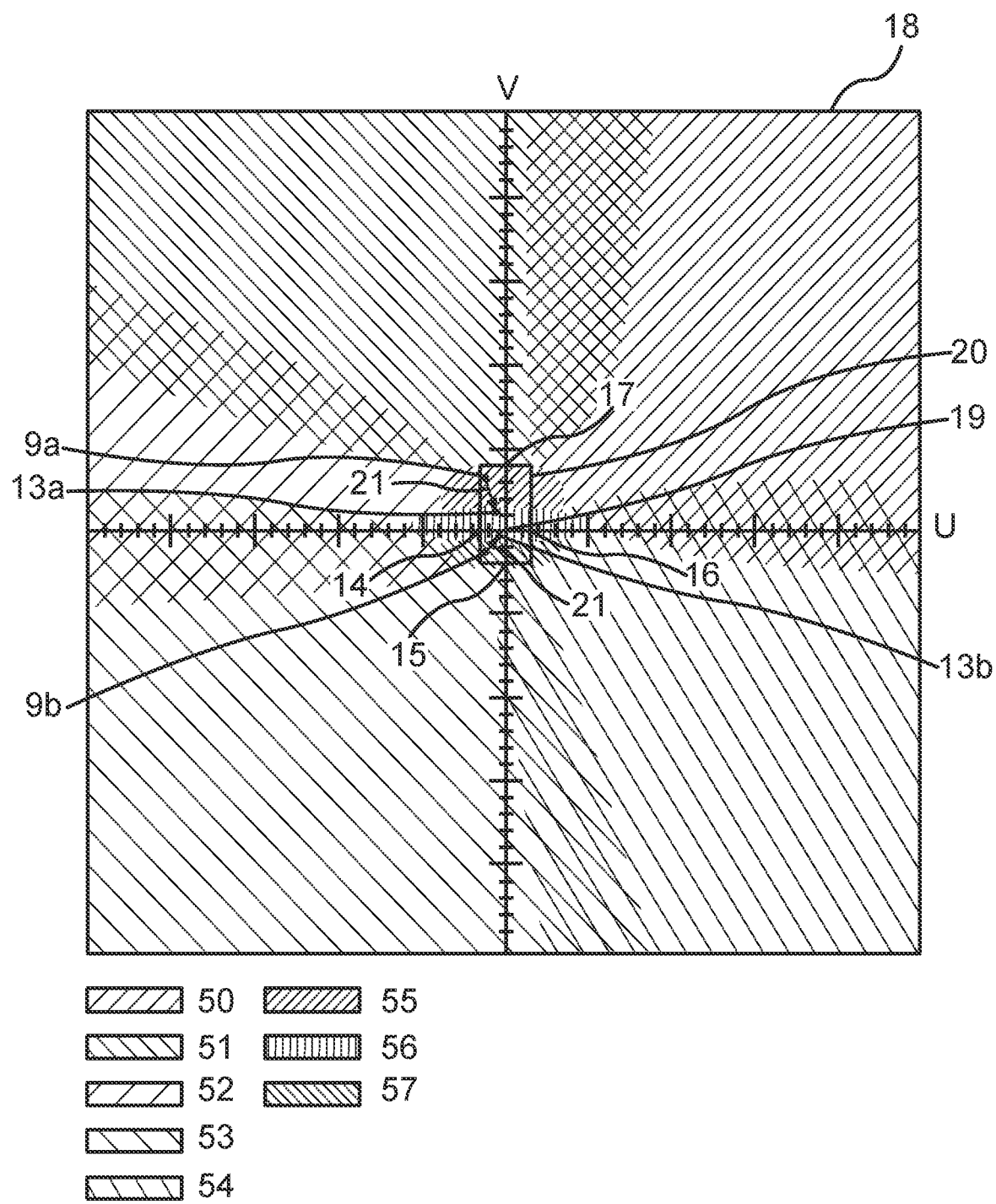
FIG. 3 a schematic representation of a UV color space of a YUV color model.

In FIG. 3 a UV color space 18 of the YUV color model is outlined. Therein the minimum U color value 14, the maximum U color value 16, the minimum V color value 15, as well as the maximum V color value 17 are exemplarily drawn in. These four extreme values are arranged around a center 19 of the UV color space 18. The center 19 of the UV color space 18 has the U value 128 and the V value 128, if the U and V axis of the UV color space 18 each extend between 0 and 255, as it is typically the case in the YUV color model. The four extreme values delimit a color space region 20 around the center 19 of the UV color space 18. The color space region 20 is the color information range in which the reference pixels describing the reference object sway.

The UV color space 18 has areas of different colors, which are shown hatched differently depending on the color. The colors range from magenta 50 to red 51, yellow 52, green 53 and blue 54. Areas of mixed colors between the colors mentioned are sketched by means of overlapping hatching. Around the center point 19, gray tones are also distinguished from one another, ranging from a gray with a red cast 55 to a pure gray 56 to a gray with a blue cast 57.

In FIG. 3 two exemplary color information 9 are drawn in for respective image pixels 8, namely the first color information 9a as well as the second color information 9b. These both lie within the drawn in color space region 20, that is when performing the checking in the method step S2 the respective color information 9a, 9b is assessed as color information 9, which is larger than the minimum color information 10 and smaller than the maximum color information 11. For this reason in method step S3 for each of these two color information 9a, 9b the corrected color information 13 is calculated, that is the first corrected color information 13a and the second corrected color information 13b. It becomes apparent that a distance 21 between the first determined color information 9a and the first corrected color information 13a in the UV color space is larger than the distance 21 between the second determined color information 9b and the second corrected color information 13b. This is because the further the determined color information 9 is from the center 19 of the UV color space 18 the larger is the distance 21 between the determined color information 9 and the corrected color information 13 and here the first determined color information 9a is further away from the center than the second determined color information 9b.

In the example drafted FIG. 3 for example the minimum U color value 14 may lie at 124, the maximum U color value 16 at 130, the minimum V color value at 123, and the maximum V color value at 137.

In case the checking step S2 is successful, for a start, for calculating the corrected U color value from the determined U color value first of all a difference value from the center of the UV color space can be determined by subtracting the number 128 from the determined U color value of the image pixel 8. The corrected U color value then is calculated as difference, wherein the determined U color value is the minuend and the product of the previously calculated difference value with the correction factor 12 is the subtrahend. The calculation for the corrected V color value is effected in analogy thereto. In method step S4 now the correspondingly calculated value is provided as corrected color information 13, which comprises the corrected U color value and the corrected V color value, for the image 7.

Figure 4:
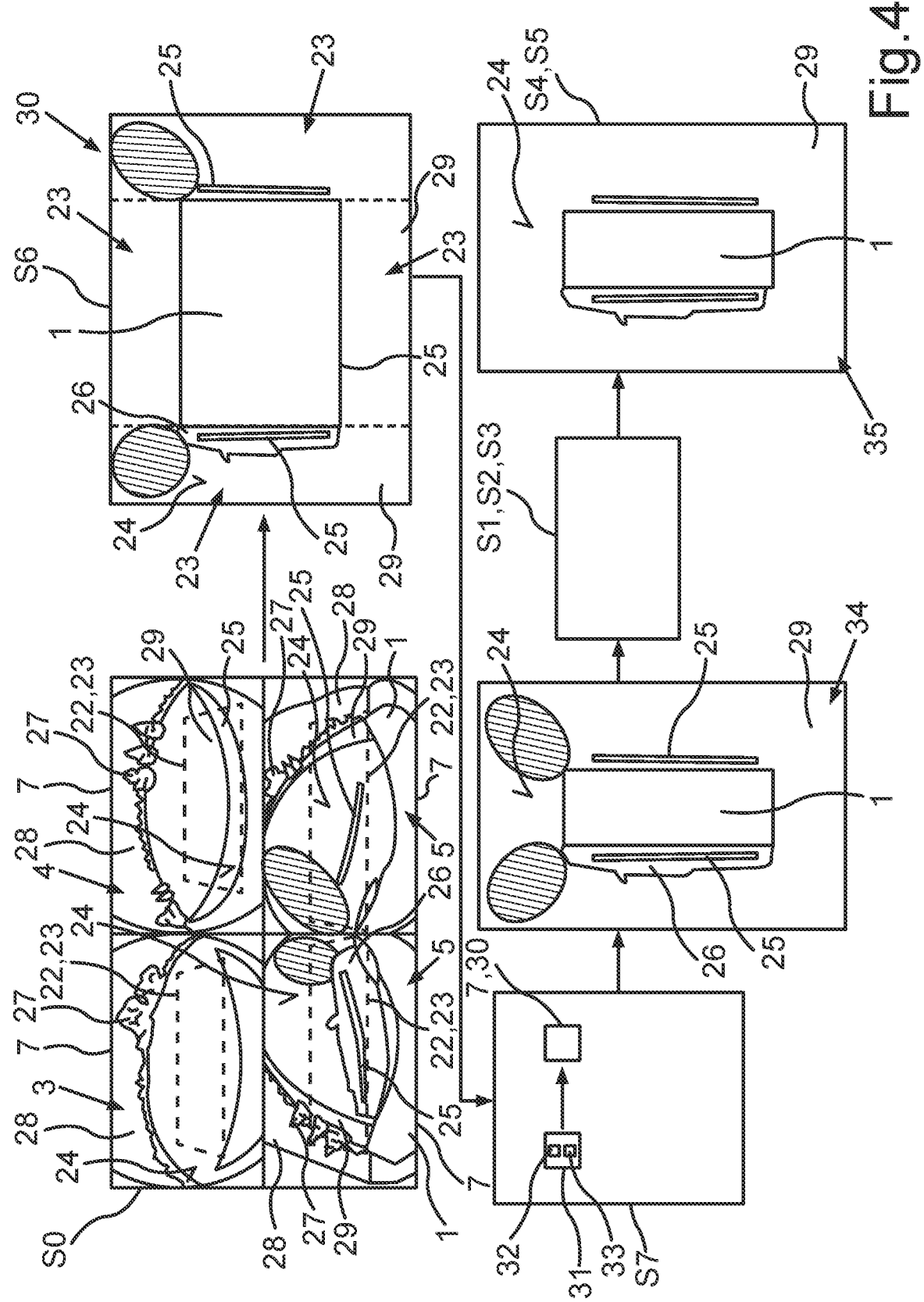
FIG. 4 a schematic representation of the correction of camera images for a motor vehicle.

In FIG. 4 it is outlined that for example, to begin with, four images 7 of the four cameras of the motor vehicle 1 may be predetermined. This means that initially for the method step S0 at the top left an image 7 of the front camera 3, at the top right an image 7 of the rear camera 4, at the bottom left an image 7 of the side camera 5 on the left side in the longitudinal direction of the motor vehicle 1, and at the bottom right the image 7 of the side camera 5 on the right side in the longitudinal direction of the motor vehicle 1 is exemplarily represented. In each of the images 7 a viewport 22 is drawn in, which here alternatively or additionally is referred to as partial image 23. The individual images 7 show the environment of the motor vehicle 1, in which across a large area a road surface 24, on which the motor vehicle 1 is arranged, is depicted. The road surface 24 is gray, in particular between black to dark gray and bright gray to white. Further in the respective images 7 parking space markings 25, a shadow 26 of the motor vehicle 1, several background objects 27, such as for example trees, a sky 28, as well as grass 29 are depicted. Purely by way of example, two areas in the images 7 are highlighted in terms of their color by means of a corresponding hatching, wherein these areas here show a gray with a red cast 55. Alternatively, the images 7 can comprise at least one area colored in gray with a blue cast 57 and/or further areas in gray with a red cast 55. Furthermore, further or alternative color casts may be considered.

In a method step S6 the four viewports 22 can be composed as respective partial images 23 into an overall image 30. In other words, the individual images 7 and here in particular the viewports 22 can be respective partial images 23 of the overall image 30, which is composed of several partial images 23. Each partial image 23 describes a subarea of the environment of the motor vehicle 1 in particular in the front region, rear region, and/or side region of the motor vehicle 1. Accordingly, the image 7 alternatively may be regarded as overall image 30, which is composed of several partial images 23. In a central region of the overall image 30 the motor vehicle 1 is positioned, which is not captured by the cameras of the motor vehicle 1. By taking the four viewports 22 into consideration, the overall image 30 here exemplarily represents a top view of the environment of the motor vehicle 1. In the composed overall image 30 various image regions are highlighted, in which for example a red shift has occurred. For this purpose, the same shadings as in FIG. 3 have been used.

In a method step S7 a harmonizing function 31 can be applied to the image 7, here to the overall image 30. The harmonizing function 31 performs a brightness harmonization 32 and/or a color harmonization 33 for the image 7 or the overall image 30, respectively. Hereupon an example image of a harmonized image 34 is shown here, from which it becomes apparent that for example transition regions between individual viewports 22 were adjusted to each other so that a continuous transition in terms of color and brightness between the individual partial images 23 was achieved. Further, the various objects from the individual images 7 of the cameras, this means for example the parking space marking 25 or the shadow 26 can be seen also in the harmonized image 34. The harmonized image 34 thus is the result of composing the images 7, here the viewports 22, in method step S6 and the subsequent application of the harmonizing function 31 to the overall image 30.

Subsequently, the method according to method steps S1 to S3 may be applied to the harmonized image 34 as image 7. The harmonized image 34 thus corresponds to the image 7, the individual image pixels 8 of which were considered in method steps S1 to S5. A resulting image 35 is drafted, which is provided in method steps S4 and S5 by the respective provided image pixels 8. Hereby above all the red shifted regions of the image 7 were corrected, meaning the regions colored in grey with red cast 55, and thus the color shift there was reduced in such a way that a correspondingly improved image 7 in the form of the resulting image 35 is provided. The resulting image 35 preferably shows only the road surface 24 in pure gray 56 without a noticeable color cast.

As an alternative to the arrangement of the order of the method steps described in FIG. 4, directly after method step S0 already the performance of method steps S1 to S5 may be effected and only subsequently the overall image 30 may be composed of the individual partial images 23 (method step S6). Thereupon method step S7, that is the harmonizing function, is applied to the composed image so that the resulting image 35 can be provided.

Figure 5:
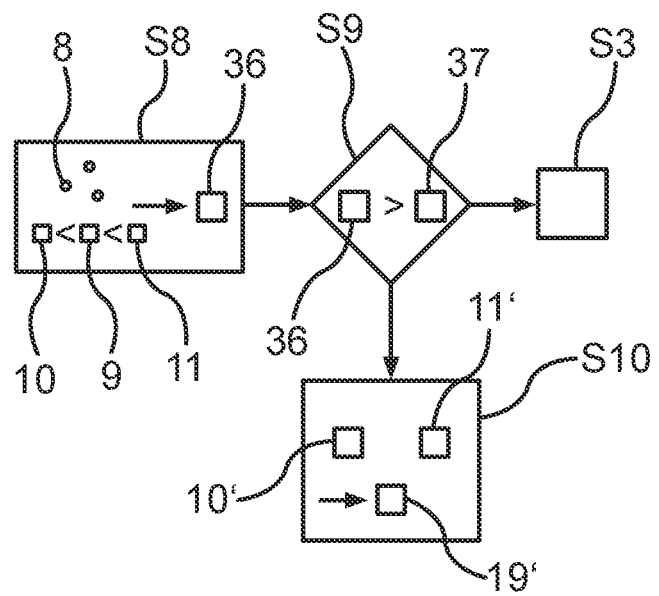
FIG. 5 in schematic representation a signal flow graph of additional method steps of the method according to FIG. 2.

In FIG. 5 further possible method steps S8 to S10 are outlined. In a method step S8 a number 36 of image pixels 8 is determined for which the determined color information 9 is larger than the minimum color information 10 and smaller than the maximum color information 11. In a method step S9 it is then checked whether the determined number 36 is larger than a minimum number 37. In case the determined number 36 is smaller than or equal to the minimum number 37, in a method step S10 a determining of an alternative minimum color information 10' and an alternative maximum color information 11' is performed. The color space region 20 delimited by the alternative minimum color information 10' and the maximum color information 11' is arranged in particular spaced from the center 19 of the UV color space 18 of the YUV color model. It may for example be envisaged that, in case the motor vehicle 1 is located on a green meadow that does not correspond to the for example gray hue of the road surface 24 and thus in terms of color does not lie within the region of the center 19 of the UV color space 18, the alternative minimum color information 10' and the alternative maximum color information 11' are determined and subsequently for example the method steps S1 to S5 can be performed in consideration of the alternative minimum color information 10' and the alternative maximum color information 11'.

It may further be envisaged that, only in case the determined number 36 is larger than the minimum number 37, the corrected color information 13 for the corresponding image pixel 8 is calculated, that is the method step S3 is performed. This means it can be presumed that it is first checked whether sufficient image pixels 8, which lie in the relevant color region to be corrected, are given, at all.

Figure 6:
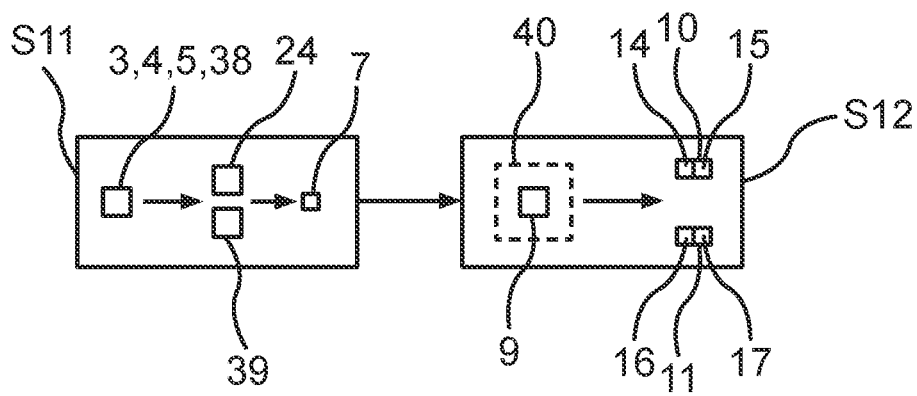
FIG. 6 in schematic representation a signal flow graph of method steps of a calibration method for the method according to FIG. 2.

In FIG. 6 a calibration method is outlined, in which, to begin with, by the front camera 3, the rear camera 4, the side camera 5, and/or another reference camera 38, which is for example arranged external to the vehicle, the road surface 24, which is in particular gray, or a light box 39 is captured in order to be able to provide the image 7, which comprises the reference pixels. Preferably at least ten reference images are captured as images 7 in a method step S11 in order to be capable of reliably providing the calibration method.

In a method step S12 a calibration algorithm 40, which comprises at least one rule for calibrating the cameras, is applied to the reference pixels captured here with their respective captured information 9. The reference pixels show the reference object, namely the road surface 24 and/or the light box 39. For this reason the determined color information 9 is invariably arranged around the center 19 of the UV color space 18. By applying the calibration algorithm 40 the minimum color information 10 and the maximum color information 11 can be determined.

The employed cameras in method step S11 all comprise substantially of a same camera lens. This means they can be assigned to a common camera type. The employed camera lenses are consequently comparable to each other at least in terms of the color shift, which is to be observed in images 7 captured by the respective camera lens. Therefore it can be concluded that the camera-lens-specific color space region 20 is delimited by the determined extreme values. Depending on the camera lens of the front camera 3, the rear camera 4, and/or the side camera 5 of the motor vehicle 1 then the corresponding minimum color information 10 and maximum color information 11, which is determined in method step S12, can be provided to the motor vehicle 1. Further, method steps S11 and S12 can be performed in the motor vehicle 1 for example on the basis of at least ten images 7 captured by the respective camera of the motor vehicle 1.

Figure 7:
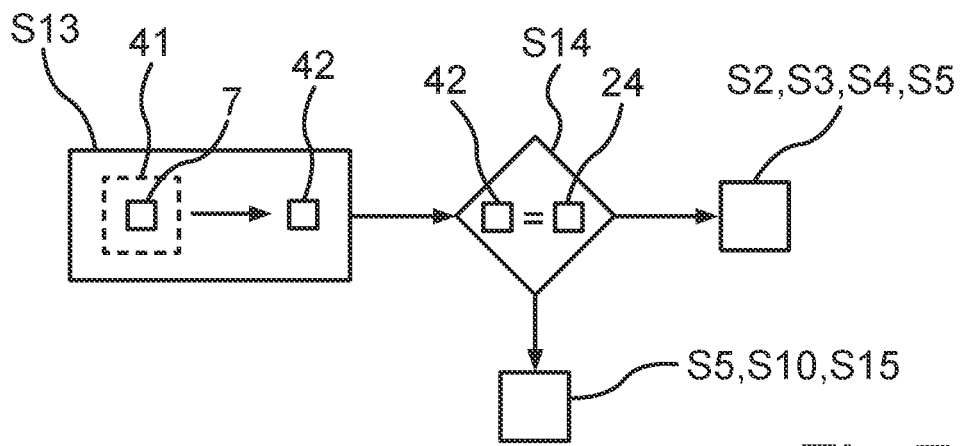
FIG. 7 in schematic representation a signal flow graph for an application of an object recognition algorithm to an image.

In FIG. 7 an embodiment is drafted, in which in a method step S13 an object recognition algorithm 41 is applied to the image 7 in order to recognize at least one object 42 in the image 7. In case in a method step S14 it is found that the recognized object 42 is the road surface 24, method steps S2 to S5 are performed. This is because then it was found that the motor vehicle 1 is located on a gray road surface 24 so that the above-described method, which is related to the center 19 of the UV color space 18 in the gray region, can be performed.

In case the checking performed in method step S14 is not successful, for example method step S5 can be effected, that is for each image pixel 8 the already determined color information 9 can be provided and no corrected color information 13 be calculated and provided. Alternatively or additionally, method step S10 can be performed, that is the alternative minimum color information 10' and the alternative maximum color information 11' may be determined. Alternatively, in a method step S15 the method can be terminated, that is method steps S1 to S5 may not be performed at all since the image 7 has not been identified as being suited for the method because no road surface 24 is represented in the image 7.

Overall the examples show an algorithm for mitigating non-uniformities in the color distribution for a camera lens. It is suggested that the described method is applied after applying the harmonizing function 31 to the composed overall image 30, which is a top view of the environment of the motor vehicle 1. Hereby each individual image pixel 8 that was skewed in a certain direction in the UV color space 18 is individually corrected. Each image pixel 8 is individually considered by the method, which checks how far away from the center 19 of the UV color space 18, which comprises the coordinate (128, 128), the determined color information 9 of the image pixel 8 is with regard to its UV coordinate in the UV color space 18. The road surface 24 is the most uniform surface which is viewed by a camera of the motor vehicle 1 in the top view representation and which thus will cover a large area in the overall image 30 composed of the individual viewports 22. The harmonizing function 31 moreover will have corrected the individual partial images 23 towards the center 19 of the UV color space 18. In method steps S1 to S5 it is checked which distance 21 from the center 19 of the UV color space 18 the respective color information 9 has regarding its U and V color value. The distance 21 is moved by shifting the U value and the V value towards the center 19, as described above, by multiplication with the correction factor 12. The gradient, by which the respective color information 9 of the respective image pixel 8 is moved to reach the corrected color information 13, determines the strength of the non-uniform camera lens performance. This should be measurable by the variance in the color value of the uniform surface of the reference object, which here is given by the road surface 24 or the light box 39. Hereby it is accomplished that only in certain color regions in the image 7 a correction is performed and that for example an image pixel 8 of a different color, which is not affected, which describes for example a parking space marking 25 or a different background object 27, remains unmodified.

What is claimed is:

1. A method for reducing a color shift of image pixels of an image for a motor vehicle captured by a camera, the method comprising, for the respective image pixel of the image captured by the camera:
   determining a color information, which describes a color of the image pixel;
   checking whether the determined color information is larger than a minimum color information and smaller than a maximum color information, wherein the minimum color information and the maximum color information delimit a color information range, in which reference image pixels describing a reference object sway; and
   only if the determined color information is larger than the minimum color information and smaller than the maximum color information, calculating a corrected color information for the image pixel in consideration of the determined color information and a correction factor and providing the calculated corrected color information instead of the determined color information, wherein the corrected color information in comparison to the determined color information has a reduced color shift.

2. The method according to claim 1, wherein the reference object is a gray road surface, or a light box.

3. The method according to claim 1, wherein the respective color information is described by a U color value and/or a V color value of a YUV color model, wherein the minimum color information is described by a minimum U color value and/or a minimum V color value and the maximum color information by a maximum U color value and/or a maximum V color value.

4. The method according to claim 2, wherein the minimum U color value and the maximum U color value as well as the minimum V color value and the maximum V color value delimit a color space region, which is arranged around a center of a UV color space of the YUV color model.

5. The method according to claim 4, wherein a distance between the determined color information and the corrected color information in the UV color space is the larger the further away the determined color information is from the center of the UV color space.

6. The method according to claim 4, wherein a number of image pixels is determined, for which the determined color information is larger than the minimum color information and smaller than the maximum color information, and it is checked whether the determined number is larger than a minimum number, wherein:
   in case the determined number is smaller than or equal to the minimum number, by evaluating the image pixels an alternative minimum color information and an alternative maximum color information is determined, the color space region delimited by the alternative minimum color information and the alternative maximum color information is arranged spaced from the center of the UV color space of the YUV color model, and
   only if the determined number is larger than the minimum number, the corrected color information for the corresponding image pixels is calculated.

7. The method according to claim 1, wherein prior to checking the determined color information of the respective image pixel a harmonizing function is applied to the image, wherein the harmonizing function performs a brightness harmonization and/or a color harmonization for the image.

8. The method according to claim 7, wherein the image is a partial image of an overall image, which is composed of at least two partial images, wherein each partial image describes a subarea of an environment of the motor vehicle, in a front region, rear region and/or side region of the motor vehicle.

9. The method according to claim 1, wherein after checking the determined color information for each image pixel of at least two images an overall image is composed, which comprises each of the at least two images as partial image, and a harmonizing function is applied to the overall image, wherein the at least two images describe different subareas of an environment of the motor vehicle in a front region, rear region, and/or side region of the motor vehicle, and the harmonizing function performs a brightness harmonization and/or a color harmonization for the overall image.

10. The method according to claim 8, wherein each partial image is a viewport of a camera image captured by the camera, wherein the overall image shows a top view of the environment of the motor vehicle.

11. The method according to claim 1, wherein by applying an object recognition algorithm to the image at least one object in the image is recognized and only in case the recognized object is a road surface, the respective corrected color information for the respective image pixel of the image is calculated.

12. The method according to claim 1, wherein the correction factor is predetermined depending on the minimum color information and the maximum color information.

13. The method according to claim 1, wherein the reference image pixels were captured by several cameras when performing a calibration method, each of which comprises a substantially same camera lens, which the camera used when capturing the image equally comprises.

14. A computer program product, which comprises at least one instruction, which, when the program is executed by a computer, causes same to perform the method according to claim 1.

15. A control device for a motor vehicle, wherein the control device is configured for performing a method according to claim 1.

* * * * *